(12) United States Patent
Lee

(10) Patent No.: US 7,062,001 B2
(45) Date of Patent: Jun. 13, 2006

(54) ADAPTIVE MULTI-CHANNEL, MULTI-FUNCTION

(75) Inventor: Jim P. Y. Lee, Nepean (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 778 days.

(21) Appl. No.: 10/232,831

(22) Filed: Sep. 3, 2002

(65) Prior Publication Data

US 2003/0063695 A1    Apr. 3, 2003

Related U.S. Application Data

(60) Provisional application No. 60/315,948, filed on Aug. 31, 2001.

(51) Int. Cl.
*H04B 7/10* (2006.01)
*H04B 1/69* (2006.01)

(52) U.S. Cl. .................. 375/347; 375/148; 375/144

(58) Field of Classification Search ............... 375/347, 375/148, 144, 316; 342/13, 147, 162; 455/227
See application file for complete search history.

(56) References Cited

U.S. PATENT DOCUMENTS

| | | | |
|---|---|---|---|
| 6,313,781 B1 | 11/2001 | Lee | |
| 6,388,604 B1 | 5/2002 | Lee | |
| 6,442,148 B1 * | 8/2002 | Adams et al. | 370/325 |
| 6,640,104 B1 * | 10/2003 | Borst et al. | 455/450 |
| 2001/0016504 A1 * | 8/2001 | Dam et al. | 455/562 |
| 2002/0175805 A9 * | 11/2002 | Armstrong et al. | 340/10.31 |

OTHER PUBLICATIONS

J.B.Y. Tsui, Microwave Rec. with Elec. warf. Appl. Wiley, NY, 1986.
Lee, J., Intr. of LPI Rad. Sig., DREO, Nov., 1991, NTIS AD A 246315.
Larson, High Sp. A-to-D Conv. withGaAs Tech.: Pros., Tr. and Ob., 1988 IEEE Intl Sl-St. Cir. Con. Tec. Dig. p. 2871-78, 1988.
Waldom, A-D Conv. Tech. comp., Proc. 1994 IEEE GaAs IC Sym. vol. 16, p. 217-219, 1994.

(Continued)

*Primary Examiner*—Khai Tran
(74) *Attorney, Agent, or Firm*—Kevin Pillay; Gowling Lafleur Henderson LLP

(57) ABSTRACT

An adaptive receiver for determining parameters of an incoming signal is provided. The adaptive receiver includes: a) a plurality of antenna channels; each of the antenna channels including a respective antenna element for receiving the incoming signal and for outputting a respective antenna channel signal; b) a switching matrix operatively coupled to receive antenna channel signals from the antenna channels; the switching matrix for distributing the antenna channel signals to a plurality of receiver channels according to a predetermined mapping; c) a multi-channel down-converter operatively coupled to receive the antenna channel signals from the receiver channels; the multi-channel down-converter for processing the antenna channel signals to output respective intermediate frequency signals; d) a plurality of analog-to-digital converters (ADCs) operatively coupled to receive the intermediate frequency signals from the multi-channel down-converter; the ADCs for converting the intermediate frequency signals to digital signals; the digital signals being indicative of at least the phase and amplitude of the incoming signal; and, e) a digital processor operatively coupled to receive the digital signals from the ADCs for determining the parameters.

13 Claims, 11 Drawing Sheets

OTHER PUBLICATIONS

Lee, J. A Mul-Ch. Dig. Rec. for Int. Anal. and Dir.-find., Pro. 1999 IEEE Pac. Rim Con. on Comm., Comp. and Sig. Pro. PACRIM99 Aug. 22-24, 1999, p. 589-592.

J.B.Y. Tsui, Dig. Tech. for Wide. Rec., Art. Hs. Inc. Nor MA 1995.

Lee, J. Prel. Des. of a Por. Bulk Ac.-Op. Sp. Ana. DREO Tech Nt 80-6, 1980, DNDC, DREO, Ontario, Canada.

R.T. Compton, Adap. Ant., Conc. and Perf., Pren. Hall, Engl. Cliffs, New Jersey, USA 1988.

* cited by examiner

ADAPTIVE MULTI-CHANNEL, MULTI-FUNCTION

This application claims priority from U.S. patent application Ser. No. 60/315,948, filed Aug. 31, 2001, and incorporated herein by reference.

The invention relates to the field of digital intercept receivers, and more specifically to multi-channel, multi-function digital intercept receivers for military reconnaissance systems.

BACKGROUND OF THE INVENTION

Various reconnaissance systems are used to intercept radar signals and to decipher their characteristics and angle-of-arrival ("AOA"). For example, a microwave intercept receiver may be used for this purpose. In Electronic Warfare ("EW") related reconnaissance applications, the receiver is typically designed to fulfil roles including radar warning, electronic support measures ("ESM"), and Electronic Intelligence ("ELINT"). (For a related discussion, see J. B. Y. Tsui, *Microwave Receivers With Electronic Warfare Applications*, Wiley, New York, 1986, which is incorporated herein by reference.) In most conventional approaches, the intercept receiver is designed to perform two functions; the first function is to measure the characteristics of an intercepted signal and the second function is to determine the intercepted signal's AOA for the purpose of direction-finding ("DF") and radar source locating.

With the proliferation of radar systems and the increasing number of radars employing complex waveform modulation, it is difficult to differentiate and sort out intercepted radar signals using coarse conventional parameters alone. Typically, these coarse conventional parameters include AOA, carrier frequency, pulse width ("PW"), pulse repetition interval ("PRI"), and scan pattern. Since many radars have similar conventional parameters, when signals having similar characteristics are compared using these coarse conventional parameters, ambiguity may occur in the sorting, classification, and identification processes.

One type of receiver which can be used to precisely measure conventional parameters, as well as intrapulse modulation, is the intrapulse receiver. However, the use of Low Probability of Intercept ("LPI") radars in recent years with low-peak power has introduced a further requirement for modem intercept receivers. Modem receivers now require a much higher sensitivity in order to detect LPI radar signals. (In this respect, see Jim P. Y. Lee, *Interception of LPI Radar Signals*, Defence Research Establishment Ottawa, November 1991, NTIS AD A 246315, which is incorporated herein by reference.)

Until recently, most radars were designed to transmit short duration pulses with relatively high peak power. This type of signal is easy to detect using relatively simple, traditional EW intercept receivers making the attacker (i.e. radar source) vulnerable to either antiradiation missiles or Electronic Counter Measures ("ECM"). However, by using LPI techniques, it is possible to design a LPI radar that is effective against traditional intercept EW receivers. One of the most important LPI techniques is the use of phase or frequency waveform coding to provide transmitting duty cycles approaching one. This technique can result in drastic reductions in the peak transmitted power while maintaining the required average power.

Therefore with an increasing number of radars employing complex waveform modulation in addition to using low peak-power LPI signals, modem intercept receivers are required to perform the following three basic functions: (a) precisely measure and characterize conventional pulsed radar signals; (b) detect and characterize LPI signals; and, (c) determine AOA for both conventional pulsed and LPI radar signals. These three basic functions must be performed well in a multiple signal environment. In addition, modern receivers are also required to operate in the presence of interfering signals while providing signal detection at close to 100% Probability-of-Intercept ("POI"). In order to achieve these desirable operational requirements, the modern receiver must meet the following criteria: (i) a large instantaneous dynamic range (e.g. at least 60 dB); (ii) a large instantaneous frequency coverage (e.g. at least 1 GHz); (iii) a 360° instantaneous field-of-view; (iv) a good receiver sensitivity; and, (v) high immunity to interfering signals. Moreover, these requirements must be achieved with a minimal amount of hardware and at low cost.

Receiver architectures employing a mix of microwave, optical, and digital technologies are currently used to achieve the three basic receiver functions described above. There are disadvantages with these receiver systems in that the use of different receiver technologies results in a more complex and costly system architecture and related implementation. Since each receiver performs one specific function, elaborate control and correlation of the different receiver outputs is required to achieve a complete picture in a high signal density environment. If correlation is not performed precisely, errors may occur in the signal recognition process. Furthermore, the original signal content from each antenna is usually not preserved during the detection process as not all of the input data is in digital format.

To address this disadvantage, fully digital receivers have been proposed. If the original signals are preserved, then the same signal appearing on other channels may be optimally processed to enhance overall signal-to-noise ratio ("SNR") during the extraction of signal characteristics. Digital receivers also have advantages relating to cost reduction, physical properties, and maintainability. With digital receivers, the trend has been to push the digital interface as close to the antennae as possible through the use of emerging analog-to-digital converter ("ADC") capabilities. With the advent of high-speed ADCs and digital signal processing technologies, a multi-function receiver may be implemented using a multi-channel digital receiver architecture.

A multi-channel digital receiver architecture, where all three basic functions (as described above) can be performed simultaneously from one complete set of digital data, has recently been proposed by Lee (see U.S. Pat. No. 6,313,781, which is incorporated herein by reference). Referring to FIG. 1, there is shown a block diagram illustrating a multi-channel, multi-function digital intercept receiver architecture 10 in accordance with Lee's proposal. The receiver architecture 10 consists of M channels, each channel comprised of an antenna 12 for receiving an incoming radar signal 22 at an AOA θ 21 from a predetermined angle axis 26, one of M down converters 14, a local oscillator ("LO") 16 signal 15, and an analog-to-digital converter 18. The receiver architecture 10 further includes a digital processor 20 for processing the digitized data from each of the M channels and for controlling the ADC 18 and down converters 14. Each antenna 12 in the array corresponds to a channel of the receiver architecture 10 and is comprised of a respective down-converter 14, which is driven by the local oscillator signal 15 to convert and amplify (i.e. gain K) the intercepted signal 22 from its respective antenna 12 to an intermediate frequency ("IF") signal. Each intermediate frequency signal is fed to a respective ADC 18, which converts the intermediate frequency signal to a digital signal which is in turn applied to the digital processing system 20 for determining the relevant parameters from all the channels. In addition, a circuit which can enhance the detection of LPI signals and at the same time suppress strong conventional pulses, has also been proposed by Lee (see U.S. Pat. No. 6,388,604, which is incorporated herein by reference).

While the receiver architecture proposed by Lee and using digital processing technology is ideal for performing a multi-function role, current digital receivers are still limited in the instantaneous dynamic range and bandwidth that they can achieve due to the relatively poor performance of currently available high sampling rate ADCs. (For a selection of currently available ADCs, see the web pages of Thomson-CSF, Maxim Integrated Products, and Acqiris Data Conversion Instruments at http://www.tcs.thomson-csf.com, http://www.maxim-ic.com, and http://www/acqiris.com, respectively.) In fact, there is a considerable gap between military requirements and the current state-of-the-shelf technology. (On this point, see Larson (L. Larson, *High Speed Analog-to-Digital Conversion with GaAs Technology: Prospects, Trends and Obstacle*, 1988 IEEE International Solid-State Circuit Conference Technical Digest, pp. 2871–2878 (1988)) and Walden (R. Walden, *Analog-to-Digital Converter Technology Comparison*, Proceedings 1994 IEEE GaAs IC Symposium, Vol. 16, pp 217–219 (1994)), which are incorporated herein by reference.) Continued development of high performance components is required to meet the stringent ADC performance specifications (e.g., dynamic range, bandwidth, power, and reliability, etc.) demanded by military system designers. Moreover, there are several fundamental factors that may limit the achievable dynamic range at high sampling rates (see Larson). Consequently, even if higher sampling rates can be achieved, ADC devices are expected to be expensive and bulky. Furthermore, with present architectures, if overall system performance is to be improved, a large number of parallel and expensive receiver channels will typically be required which will result in high implementation costs.

A need therefore exists for an improved multi-channel, multi-function digital intercept receiver that may be implemented economically. Consequently, it is an object of the present invention to obviate or mitigate at least some of the above mentioned disadvantages.

SUMMARY OF THE INVENTION

The invention overcomes at least some of the disadvantages of the prior art by providing a four-channel adaptive architecture for multi-function digital intercept receivers. Advantageously, the adaptive architecture may be implemented economically using low cost, commercial off-the-self ("COTS") components. In addition, the adaptive architecture provides for the extension of total instantaneous frequency coverage, for the extension of instantaneous dynamic range, and for the rejection of unwanted or interfering signals.

According to one aspect of the invention, an adaptive receiver for determining parameters of an incoming signal is provided. The adaptive receiver includes: a) a plurality of antenna channels; each of the antenna channels including a respective antenna element for receiving the incoming signal and for outputting a respective antenna channel signal; b) a switching matrix operatively coupled to receive antenna channel signals from the antenna channels; the switching matrix for distributing the antenna channel signals to a plurality of receiver channels according to a predetermined mapping; c) a multi-channel down-converter operatively coupled to receive the antenna channel signals from the receiver channels; the multi-channel down-converter for processing the antenna channel signals to output respective intermediate frequency signals; d) a plurality of analog-to-digital converters (ADCs) operatively coupled to receive the intermediate frequency signals from the multi-channel down-converter; the ADCs for converting the intermediate frequency signals to digital signals; the digital signals being indicative of at least the phase and amplitude of the incoming signal; and, e) a digital processor operatively coupled to receive the digital signals from the ADCs for determining the parameters.

According to anther aspect of the invention, the multi-channel down-converter includes an intermediate frequency amplifier and a gain control circuit for each of the receiver channels for amplifying the intermediate frequency signals according to predetermined gains.

According to anther aspect of the invention, the predetermined gains are selected to adjust the dynamic range coverage of the receiver channels to extend overall instantaneous dynamic range coverage.

According to anther aspect of the invention, the intermediate frequency signals include predetermined offsets.

According to anther aspect of the invention, the predetermined offsets are selected to adjust the instantaneous frequency range coverage of the receiver channels to extend overall instantaneous frequency range coverage.

According to anther aspect of the invention, the plurality of receiver channels numbers four.

According to anther aspect of the invention, the antenna element is included in an antenna face; the antenna face including a plurality of antenna elements.

According to anther aspect of the invention, the antenna face is included in an antenna array block; the antenna array block including a plurality of antenna faces; each of the plurality of antenna faces pointing in a different direction.

According to anther aspect of the invention, the plurality of antenna faces numbers four.

According to anther aspect of the invention, the parameters include an angle-of-arrival (AOA) of the incoming signal.

According to anther aspect of the invention, the incoming signal includes signals emitted from conventional and low probability of intercept (LPI) radar systems.

According to anther aspect of the invention, the parameters include an average amplitude and a phase of an unwanted or interfering signal for digitally nullifying the unwanted or interfering signal by the digital processor.

According to anther aspect of the invention, the multi-channel down-converter includes at least one local oscillator.

BRIEF DESCRIPTION OF THE DRAWINGS

Embodiments of the invention may best be understood by referring to the following description and accompanying drawings. In the description and drawings, like numerals refer to like structures and/or processes. In the drawings.

DETAILED DESCRIPTION OF THE PREFERRED EMBODIMENTS

Figure 1:
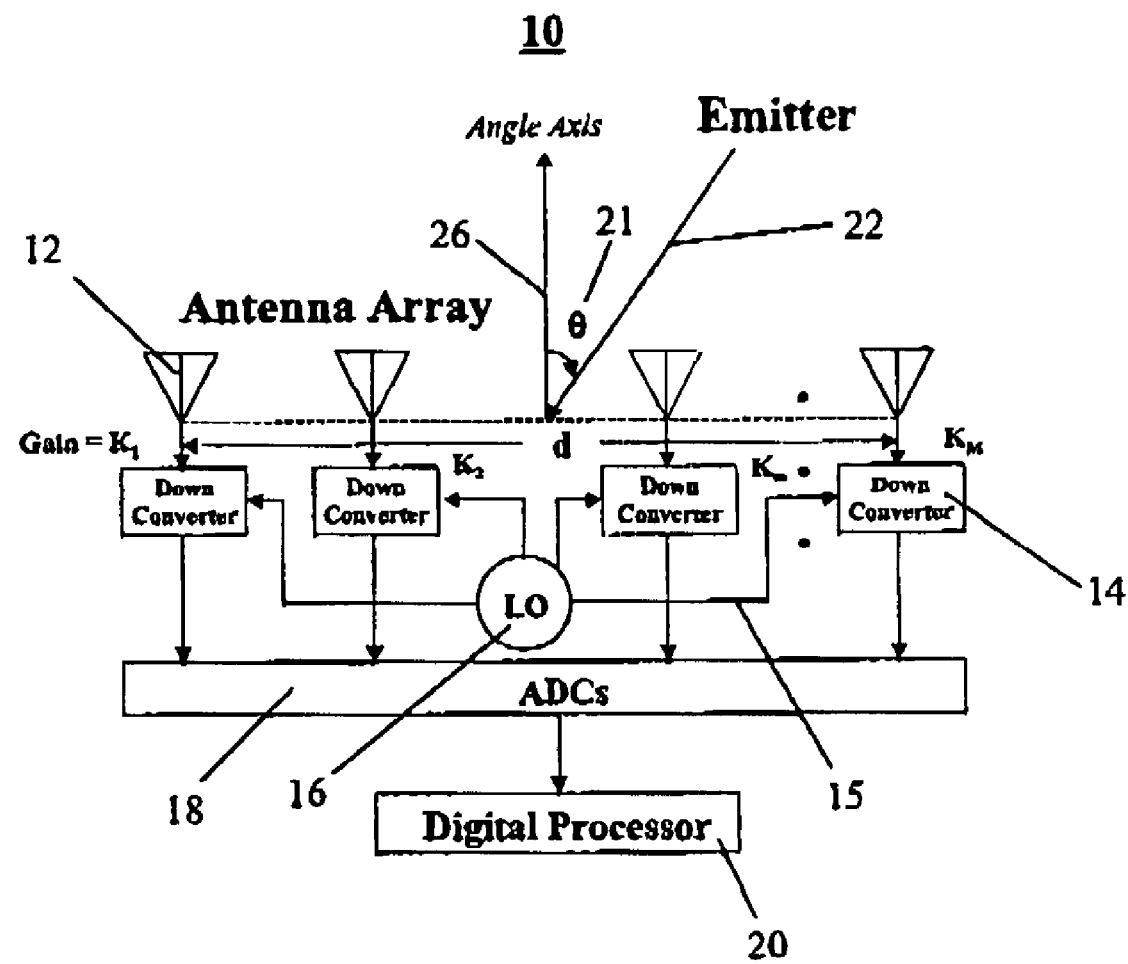
FIG. 1 is a block diagram illustrating a multi-channel, multi-function digital intercept receiver architecture in accordance with the prior art.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. In the drawings, like numerals refer to like structures or processes.

In general, the invention described herein provides a four-channel adaptive architecture for multi-function digital intercept receivers. The adaptive architecture performs the three basic functions typically required of modern intercept receivers, namely, it can be used to: (a) precisely measure and characterize conventional pulsed radar signals; (b) detect and characterize LPI signals; and, (c) determine AOA for both conventional pulsed and LPI radar signals. Moreover, the adaptive architecture can also operate in the presence of interfering signals while providing signal detection at close to 100% POI. To achieve these criteria, the adaptive architecture provides: (i) a large instantaneous dynamic range on the order (i.e. at least 60 dB); (ii) a large instantaneous frequency coverage (i.e. at least 1 GHz); (iii) a 360° instantaneous field-of-view; (iv) good receiver sensitivity; and, (v) high immunity to interfering signals. In addition, the adaptive architecture may be implemented economically using low cost, COTS components.

Figure 2:
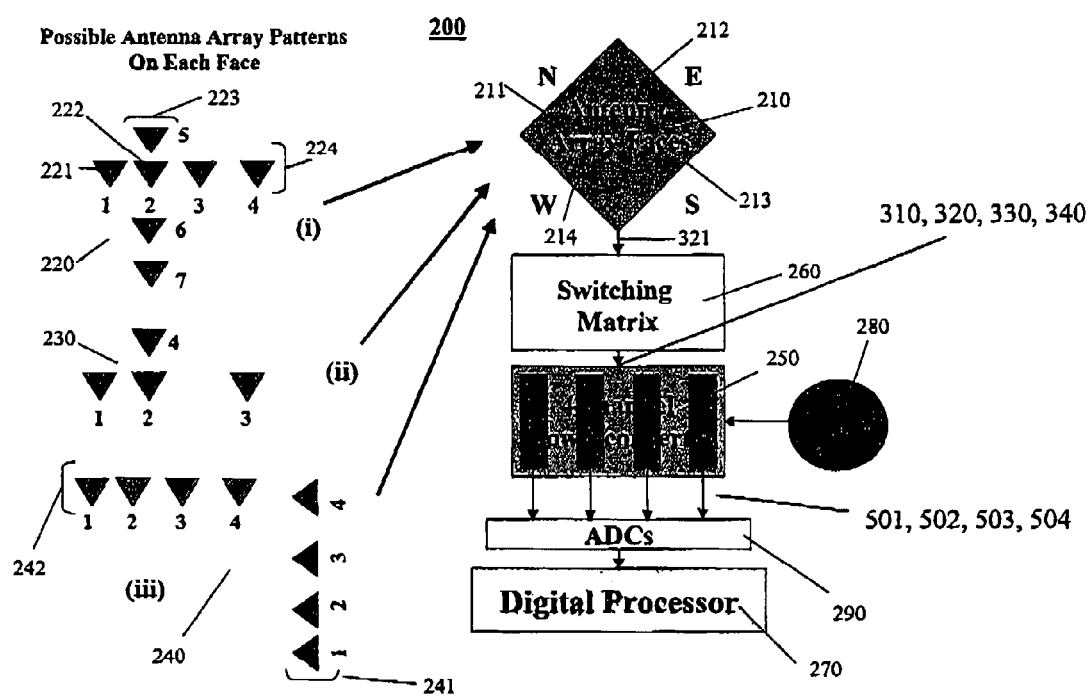
FIG. 2 is a block diagram illustrating an adaptive multi-channel, multi-function digital receiver architecture in accordance with an embodiment of the invention.

Architecture. Referring to FIG. 2, there is shown a block diagram illustrating an adaptive multi-channel, multi-function digital intercept receiver architecture 200 in accordance with an embodiment of the invention. The architecture 200 is suitable for use as an adaptive multi-channel, multi-function digital intercept receiver. The architecture 200 includes: an antenna array block 210 having four antenna faces 211, 212, 213, 214, each antenna array having an antenna array pattern 220,230,240, and each antenna array having at least one antenna element 221 for receiving an incoming radar signal 22 on one of the faces, generally at an AOA θ 21 from a predetermined angle axis 26; a switching matrix 260 coupled to the antenna array block 210 for mapping selected antenna outputs 321 into one of four parallel channels 310, 320, 330, 340 of a four-channel down-converter 250; at least one local oscillator ("LO") 280 coupled to the four-channel down-converter 250 for performing down-conversion operations; the four-channel down-converter 250 for receiving the four channels 310, 320, 330, 340 from the switching matrix 260 and for filtering, amplifying and down-converting each incoming signal to an intermediate frequency ("IF") signal; analog-to-digital converters ("ADC") 290 coupled to the outputs 501, 502, 503, 504 of the four-channel down-converter 250 for converting each IF signal into a digital signal; and, a data processing system 270 for receiving each digital signal, for determining relevant parameters and characteristics of the incoming signal 22 from the digital signals, and for controlling the operation of the architecture 200.

The antenna array block 210 may have at least four faces 211, 212, 213, 214 covering different directions or quadrants and each face may have a different antenna array arrangement pattern 220, 230, 240. The local oscillator 280 is used to drive the multi-channel down-converter 250 for performing down-conversion operations. The multi-channel down-converter 250 is used for filtering, down converting, and amplifying the incoming radar signal 22 from the output 321 of an antenna element 221 to an IF signal. The ADCs 290 are for converting the incoming radar signal 22, or a down-converted version of this signal at an intermediate frequency, to a digital signal.

The data processing system 270 may include an input device, a central processing unit or CPU, memory, a display, and an output device. The input device may include a keyboard, mouse, trackball, or similar device. The CPU may include dedicated coprocessors and memory devices. The memory may include RAM, ROM, databases, or disk devices. The display may include a computer screen, terminal device, or television. And, the output device may include a CD-ROM, a floppy disk, a printer, or a network connection. The architecture 200 has stored therein data representing sequences of instructions which when executed cause the method described herein to be performed. Of course, the architecture 200 may contain additional software and hardware a description of which is not necessary for understanding the invention.

In operation, in order to achieve a 360-degree instantaneous field-of-view, antenna arrays 220, 230 or 240 are mounted facing all directions. In FIG. 2, four faces 211, 212, 213, 214 covering the four different directions are shown (i.e. north, east, south, and west). Spatial overlapping between adjacent faces (e.g. 211, 212) is provided for continuous coverage by the antenna elements 221. As such, chosen antennae will typically have a wide beam-width. Typically, 6-dB beam-widths are on the order of 80 degrees for cavity back spiral antennas. (For a selection of available antennae, see Transco Products Inc.'s *RF/Microwave Antennas Catalogue*.) Three different patterns 220, 230, 240 of antenna array arrangements for each face 211, 212, 213, 214 are also shown in FIG. 2. The first pattern 220 is comprised of seven antenna elements 221. A common element 222 is shared by two four-element orthogonal arrays 223, 224. This first pattern 220 may be used for wide frequency band coverage where the frequency range is an octave or more (e.g. from 2–18 GHz) and where both the elevation and azimuth angles are to be measured. The second antenna array pattern 230 is typically used for narrow frequency band coverage (e.g. the S- or X-band navigation frequencies alone). The third pattern 240 is similar to the first pattern 220 with the exception that the two independent, orthogonal arrays 241, 242 do not have a common element 222.

For example, and referring back to the prior art receiver architecture 10 illustrated in FIG. 1, if the first antenna array pattern 220 were used in this prior art architecture 10, there would be a total of twenty-eight (i.e. 4×7) outputs to be connected to the multi-channel receiver. If all of the outputs were to be detected and processed in parallel, then a 28-channel receiver would be required. One receiving channel in the prior art architecture 10 includes a microwave down-converter channel 14, local oscillator signal 15 and an ADC 18. Consequently, this architecture 10 is bulky and expensive. Moreover, with this prior art architecture 10, the challenge of processing the data in or near real-time remains dominant.

It is an advantage of the present invention that the number of receiving channels is kept to a minimum resulting in a reduction of hardware and total system cost. In an embodiment of the invention, four parallel receiving channels have been used. Four channels were selected as this number of channels provides a good compromise between performance and cost. For example, most multi-port components and devices are designed with outputs that are multiples of two. As such, a choice of four channels has a positive impact on cost and component utilization. Having selected the number of parallel channels as four, these four channels are inputs to the four-channel down-converter 250 and ADCs 290. The architecture 200 is designed to make use of these four channels to perform, adaptively, all of the basic functions required by a receiving system as outlined above.

Figure 3:
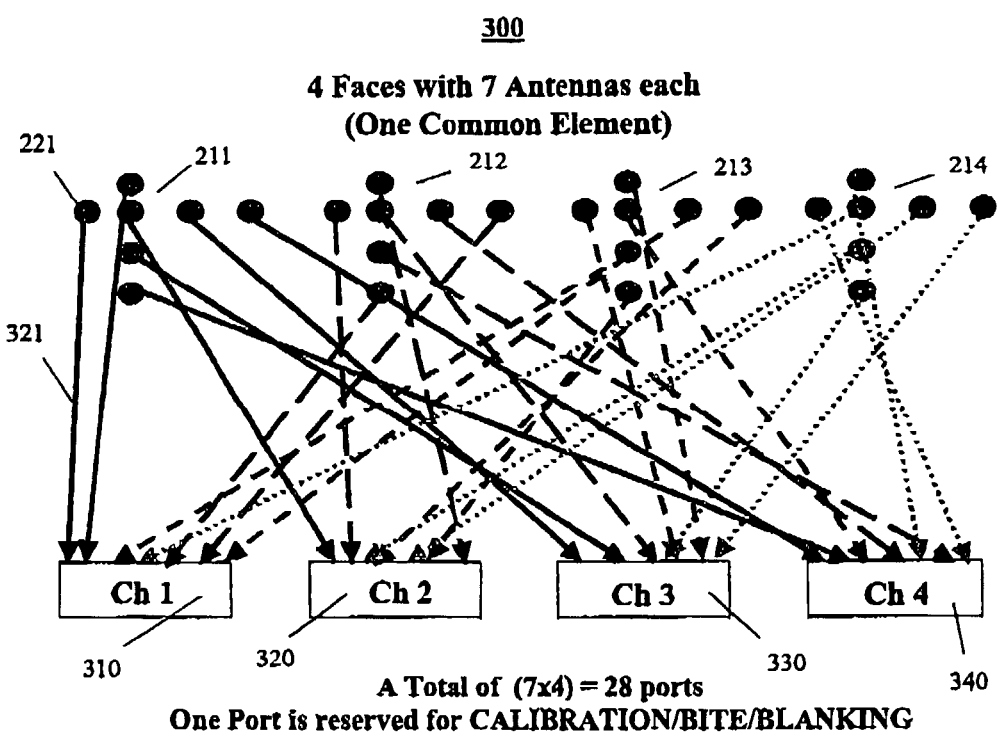
FIG. 3 is a block diagram illustrating a spatial mapping of antenna outputs from a four-face antenna block, where each face has seven antenna elements, into four parallel receiving channels in accordance with an embodiment of the invention.

Switching Matrix. In order to transform a large number (M) of antenna outputs (e.g. 28) to a small number (N) of receiving channels (e.g. 4), the switching matrix 260 is used to map the M antenna outputs 321 into the N receiving channels. The switching matrix 260 performs a spatial distribution mapping of antenna outputs 321 into four parallel receiving channels. Referring to FIG. 3, there is shown a block diagram illustrating a spatial mapping 300 of antenna outputs 321 from a four-face antenna array block 210, where each face 211, 212, 213, 214 has seven antenna elements 221, into four parallel receiving channels 310, 320, 330, 340 in accordance with an embodiment of the invention. This spatial mapping 300 may be performed using 8-pole-single-throw ("8PST") switches. Various other spatial mappings may also be used depending on the antenna array pattern 220, 230, 240 and the number of faces 211, 212, 213, 214 to be covered.

Typically, one of the antenna outputs 321 from each antenna face 211, 212, 213, 214 is mapped onto one of the four parallel channels 310, 320, 330, 340 of a four-channel down-converter 250 for detecting the presence of signals from all four directions. Consequently, all of the signals from any direction within the down-converted frequency band may be detected and characterized.

A coarse AOA may also be determined by using a method of amplitude comparison. Once the direction of a signal of interest is located within a quadrant (e.g. 211), the switching matrix 260 can be re-configured. Any four outputs 321 of the antenna arrays 223, 224 in that particular face 211 can then be routed to the four-channel down-converter 250 to accurately determine the corresponding azimuth and elevation angles. This may be accomplished by sequentially measuring these angles or through a combination of other methods. For example, in the case of the second antenna array pattern 230 shown in FIG. 2, both the azimuth and elevation angles may be measured simultaneously.

Since high-speed and high-performance ADCs for EW applications are not typically available, while lower-cost COTS components are now readily available, the receiver architecture 200 makes use of COTS components for achieving system performance requirements. Commercial ADCs with an 8-bit resolution, sampling at a 1-GHz rate, are presently available from suppliers including Thomson-CSF, Maxim Integrated Products, and Acqiris Data Conversion Instruments. Advantageously, these COTS components may be used as basic building blocks for the receiver architecture 200. The receiver architecture 200 is based on a four-channel down-converter 250 with its output signals being digitized by 1-GHz sampling rate ADCs 290 with 8-bit resolution. The four-channel outputs 310, 320, 330, 340 of the switching matrix 260 are input to the four-channel down-converter 250. The outputs from the four ADCs 290 are input to the data processing system 270. The use of relatively low-cost COTS ADCs running at relatively modest rates may be configured to achieve extended instantaneous frequency coverage and instantaneous dynamic range. As will be described below, the present invention provides switching and processing methods to achieve improved instantaneous frequency coverage and instantaneous dynamic range while at the same time providing cancellation of unwanted and interfering signals.

Extension of Instantaneous Frequency Coverage. In order to improve the POI for searching unknown signals, the total instantaneous frequency coverage must be expanded. In the general case where the total input frequency coverage (e.g. 2–18 GHz) of the receiver 200 is much wider than the instantaneous frequency coverage (e.g. 1 GHz), a two-stage frequency conversion process is required for the down-converter 250 in order to eliminate image signals generated by the frequency conversion process. The incoming signals received by the four channels 310, 320, 330, 340 are first converted to a relatively high $1^{st}$ IF signal using a common LO 280 by using either an up or down conversion process. The $1^{st}$ IF signal is then down converted to the final IF signal 501, 502, 503, 504 with the same bandwidth before being digitized by an ADC 290. If all of the four parallel receiving channels 310, 320, 330, 340 are used to cover the same input frequency band, as is the case for normal operation, then the total instantaneous frequency coverage will be limited by the sampling rate of the ADCs 290. However, if each of the four channels 310, 320, 330, 340 is used to cover a slightly different input frequency band, then a much broader instantaneous frequency coverage can be achieved using the same type of ADC.

Figure 4:
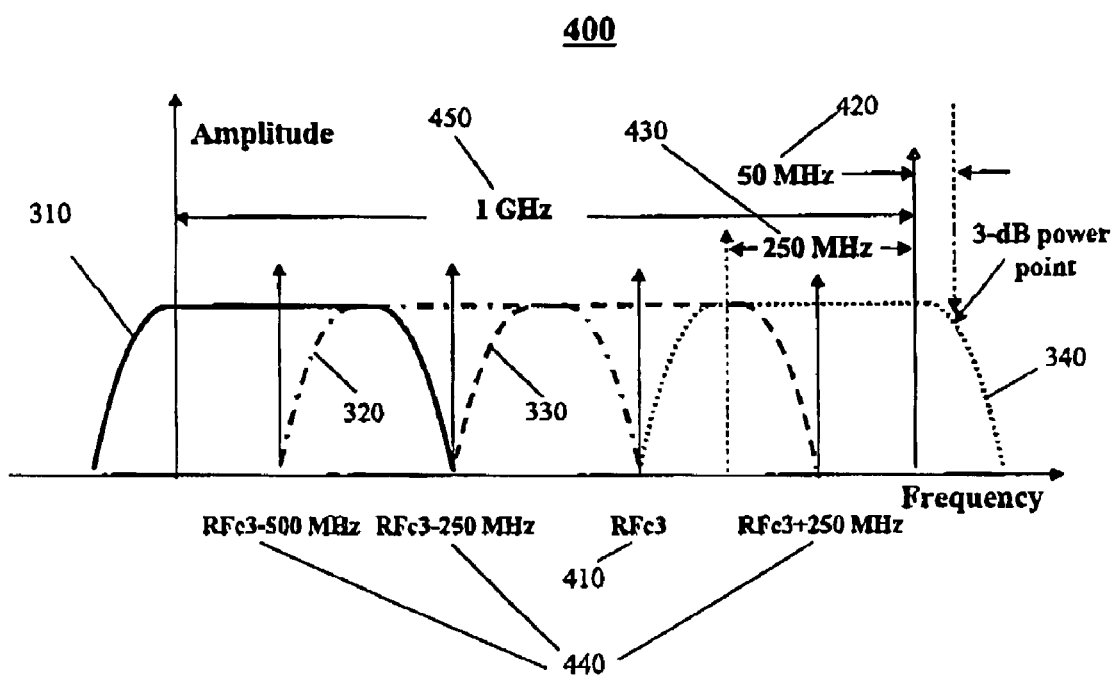
FIG. 4 is a graph illustrating an amplitude versus frequency mapping four channels for wide instantaneous frequency band coverage in accordance with an embodiment of the invention.

Referring to FIG. 4, there is shown a graph 400 illustrating an amplitude versus frequency mapping for four channels 310, 320, 330, 340 with an equal frequency offset of 250 MHz 430 for wide instantaneous frequency band coverage in accordance with an embodiment of the invention. The total instantaneous frequency coverage of the four channels is 1 GHz 450 and is plotted on the graph 400 of FIG. 4. Since there is an equal offset in frequency coverage between each of the four channels 410, 440, the center frequency of Channel 3 330 is used as a reference and is labeled as RFc3 410 in FIG. 4. In order to down-convert the different $1^{st}$ IFs to the same final IF, different LOs 280 are needed in the $2^{nd}$ down-conversion stage for each of the four channels 310, 320, 330, 340. The implementation of a multi-channel down-converter 250 with different offset frequencies may be achieved easily and will not be described here. If a COTS ADC is assumed to be operating at a 1-GHz sampling rate, then an instantaneous bandwidth of 350 MHz of a digital band-pass filter may be achieved using a Hilbert transformer. (On this point, see Jim P. Y. Lee, *Multi-Channel Digital Receiver: Intrapulse Analysis And Direction-Finding*, DREO Report No 1343, May, 1998, and Jim P. Y. Lee, *Multi-Channel Digital Receiver for Intrapulse Analysis and Direction-finding*, Proceedings 1999 IEEE Pacific Rim Conference on Communications, Computers and Signal Processing (PACRIM 1999), Aug. 22–24, 1999, pp. 589–592, which are incorporated herein by reference.) This transformer can be designed to have a digital band-pass filter bandwidth of 350 MHz 420, 430 as illustrated in FIG. 4. This Hilbert transformer will allow both the in-phase/quadrature ("I/Q") components to be extracted from the final down-converted intermediate frequency (IF) signal. Both the down-converter and the Hilbert digital transformer determine the ultimate instantaneous frequency band shape 310, 320, 330, 340 for each channel. If a 50-MHz guard band 420 is allowed on each side of the band-pass filter, then an instantaneous frequency coverage of 250 MHz 430 may be achieved. If each of the four channels 310, 320, 330, 340 is used to cover a slightly different input frequency band with a constant offset in frequency of 250 MHz 430 as shown in FIG. 4, then an instantaneous frequency coverage of 1 GHz 450 may be achieved with 50 MHz guard bands 420. The 50-MHz guard band 420 is the same between each of four channels 310, 320, 330, 340 and at both edges of the combined 1-GHz filter band 450. As a result, a narrow band radar signal falling within the 1-GHz band 450 will be detected in one of the four channels 310, 320, 330, 340 with a minimum available instantaneous bandwidth of 100 MHz. This minimizes signal distortion due to insufficient instantaneous bandwidth.

Extension of Instantaneous Dynamic Range. The instantaneous dynamic range of current digital receivers is typically limited by the performance of available COTS ADC devices. As mentioned, the increasing ADC requirements for EW applications are difficult to achieve with existing military and COTS ADCs. Commercial digitizers with ADCs sampling at a 1-GHz rate and with 8-bit resolution are widely available. However, the number of effective bits of these devices is usually limited to approximately seven bits or less. This translates to an effective instantaneous dynamic range of approximately 40 dB. (On this point, see J. B. Y. Tsui, *Digital Techniques for Wideband Receivers*, Artech House Inc., Norwood, Mass., 1995, which is incorporated herein by reference.) The requirement for instantaneous dynamic range in typical EW applications is on the order of 60 dB or more. If a receiver is required to detect low peak power LPI signals in the presence of strong conventional pulsed signals, then a minimum instantaneous dynamic range of the order of 100 dB may be required. (On this point, see Jim P. Y. Lee, *Interception of LPI Radar Signals*, Defence Research Establishment Ottawa, November 1991, NTIS AD A 246315, which was referred to above.)

One method for augmenting the limited instantaneous dynamic range of a single device is to use a number of these devices to cover different portions of a larger dynamic range. The first step in this method is to partition the required large instantaneous dynamic range into a number of smaller dynamic ranges that can be supported by each device. Some overlapping in dynamic range must be allowed for between the smaller dynamic ranges covered by contiguous devices. This overlapping allows a signal with a power level falling between two devices to be reconstructed later without degradation. Such a scheme was proposed and implemented by Lee in 1980 for extending the instantaneous dynamic range of an optical receiver using two or more photo-detector arrays (see Jim P. Y. Lee, *Preliminary Design of a Portable Bulk Acousto-Optic Spectrum Analyzer*, DREO Tech. Note 80-6, 1980, Department of National Defence Canada, Defence Research Establishment Ottawa, Ontario, Canada, which is incorporated herein by reference). A much larger instantaneous dynamic range was achieved in that implementation by first splitting the output optical signal beam into two or more beams with different power levels and then using a number of identical photo-detector arrays for detection. A similar method may be used to extend the overall instantaneous dynamic range for the adaptive receiver architecture 200 of the present invention.

Figure 5:
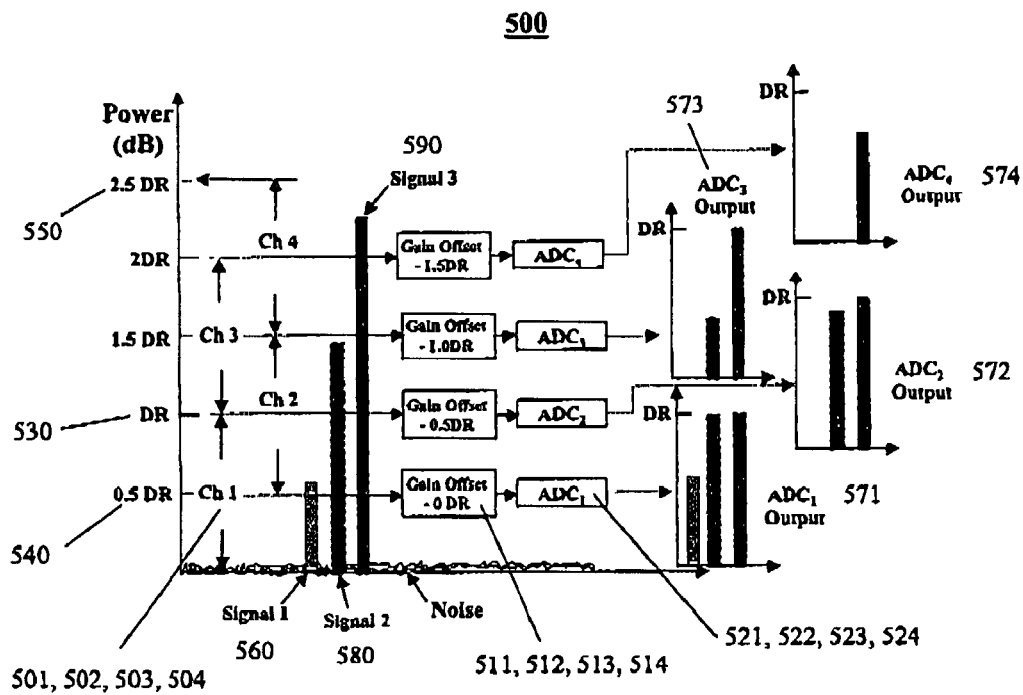
FIG. 5 is a block diagram illustrating a four-channel digitization system for extending instantaneous dynamic range in accordance with an embodiment of the invention.

Referring to FIG. 5, there is shown a block diagram illustrating a four-channel digitization system 500 for extending instantaneous dynamic range in accordance with an embodiment of the invention. The four-channel digitization system 500 includes gain controls 511, 512, 513, 514 for adjusting the IF gain of the final down-converted signals 501, 502, 503, 504. The down-converted signals 501, 502, 503, 504 are then coupled to respective ADCs 521, 522, 523, 524. The four-channel digitization system 500 is included in the associated ADC circuitry 290. This system 500 is similar to that implemented by Lee in 1980 with one exception. Since there are already four parallel channels 310, 320, 330, 340 with four ADCs 521, 522, 523, 524 available in the down-converter 250, there is no need to fit-her split the output signal from any of the four channels 310, 320, 330, 340. This is so because at least four antenna outputs 321 facing the same direction (e.g. 211) can be routed into any of the four parallel channels 310, 320, 330, 340 using the switching matrix 260. In this case, the only necessary step is to appropriately adjust the gain of the analog IF amplifier feeding each ADC 521, 522, 523, 524 using the gain controls 511, 512, 513, 514.

As illustrated in FIG. 5, if the instantaneous dynamic range ("DR") 530 of one ADC 521, 522, 523, 524 is assumed to be of 40 dB, and if half of this DR or 20 dB (i.e. 0.5 DR 540) is chosen for overlapping, then a total instantaneous dynamic range of 100 dB (i.e. 2.5 DR 550) can be achieved. In this example, Channel 1 310, 501 is the most sensitive part of the down-converter 250 and can be used to detect the weakest signals intercepted by the antenna array 220, 230, 240. Signal 1 560, as illustrated in FIG. 5, will appear as undistorted at the output of Channel 1 571, while Signal 2 580 and Signal 3 590 will appear to be saturated. The saturation level may be recognized either by checking the maximum value of the digitized values or by comparing the output power levels appearing in the different channels. The use of half a DR 540 (i.e. 20 dB) for dynamic range overlapping between any two ADCs 521, 522, 523, 524 guarantees an output signal in any of the four channels 571, 572, 573, 574 with a reasonably good signal-to-noise ratio ("SNR") while at the same time allowing enough of a margin to accommodate differences in received power levels. These differences in received power levels are typically due to receiver channel-to-channel gain variations and propagation effects on received signal levels intercepted by antennas 221 positioned at slightly different locations.

Rejection of Unwanted or Interfering Signals. The use of four quadrants 211, 212, 213, 214 in the architecture 200 of the present invention allows for some spatial isolation. Isolation level measurements have been performed at a frequency of 9.4 GHz using one face 211, 212, 213, 214. The outputs 321 from each of the antennas 221 (e.g. 6–18 GHz cavity back spiral antennas) on one face 211, 212, 213, 214 were measured as a function of AOA 21. The received signal levels were found to be at least 25 dB down when the signal intercepted was 90 degrees or more from bore-sight. In other words, there is good spatial isolation when two signals are separated in angle by more than 90 degrees.

If an interfering or undesirable signal is at an angular separation of less than 90 degrees from a desirable signal, then some other means is needed to achieve good isolation. Conventional radar signals are usually of very short duration and thus the chance of pulse overlapping in time is usually small. If two signals are time coincident, but separated quite far apart in frequency, then filtering in the frequency domain may suffice. However, there are occasions where the interfering signal may be of long duration (e.g. frequency and phase modulated signals and CWs) and at the same time cannot be filtered out in the frequency domain without introducing distortion to the desirable signal. In these circumstances, a form of digital beam-steering may be required. Since the architecture 200 of the present invention includes parallel antenna arrays and since the signal data are saved in digital format within the data processing system 270, a beam-steering technique may be used to nullify undesirable signals. (On this point, see R. T. Compton, *Adaptive Antennas, Concepts and Performance*, Prentice Hall, Englewood Cliffs, N.J., USA, 1988, which is incorporated herein by reference.)

In the following, a method is described for nullifying undesirable signals using the architecture of the present invention. For multi-channel receivers operating in the radar frequency bands and employing phase difference measurement to determine AOA, the antenna elements are designed to be located very close to each other. The resultant time-difference-of-arrival for an intercepted signal between all four channels are usually less than 1 nsec and thus it may be assumed that the received signals arrive at the same time. As a result, the present invention employs a method for canceling out undesirable signals using only the average relative amplitude and phase information when the time-difference-of-arrival between the signals is small.

In general, since there are four channels 310, 320, 330, 340, the method cancels the signal appearing in Channel 1 310 by the signal in Channel 2 320, and the signal in Channel 3 330 by the signal in Channel 4 340. This is carried out by first multiplying the signal measured in Channel 2 320 by the factor $[-\underline{a}_1/\underline{a}_2 \exp(-j\underline{\phi}_{21})]$ and the signal in Channel 4 by the factor $[-\underline{a}_3/\underline{a}_4 \exp(-j\underline{\phi}_{43})]$ before adding all of the signals together. Here, and in the following, the symbols $a$ and $\phi$ represent the mean amplitude and phase of the signal, respectively, and the subscripts refer to the channel number (i.e. Channels 1 through 4 310, 320, 330, 340). The underscore symbol "_" denotes an estimated value which may be an actual value of the signal measured previously or from other means.

Hence, the sum of the original signals in Channels 1 310 and 3 330 and the normalized and phase-shifted signals in Channels 2 320 and 4 340 is given by $$\begin{aligned}
S_1 - \underline{S}_1 + S_3 - \underline{S}_3 = {}& a_1\exp(j\phi_1) - \\
& a_2\exp(j\phi_2)\underline{a}_1/\underline{a}_2\exp(-j\underline{\phi}_{21}) + \\
& a_3\exp(j\phi_3) - a_4\exp(j\phi_4)\underline{a}_3/\underline{a}_4\exp(-j\underline{\phi}_{43}) \\
= {}& \{a_1\cos(\phi_1) - a_2\underline{a}_1/\underline{a}_2[\cos(\phi_2)\cos(\underline{\phi}_{21}) + \\
& \sin(\phi_2)\sin(\underline{\phi}_{21})] + a_3\cos(\phi_3) - \\
& a_4\underline{a}_3/\underline{a}_4[\sin(\phi_4)\sin(\underline{\phi}_{43}) + \\
& \cos(\phi_4)\cos(\underline{\phi}_{43})]\} + j\{a_1\sin(\phi_1) - \\
& a_2\underline{a}_1/\underline{a}_2[\sin(\phi_2)\cos(\underline{\phi}_{21}) - \\
& \cos(\phi_2)\sin(\underline{\phi}_{21})] + \\
& a_3\sin(\phi_3) - a_4\underline{a}_3/\underline{a}_4[\sin(\phi_4)\cos(\underline{\phi}_{43}) - \\
& \cos(\phi_4)\sin(\underline{\phi}_{43})]\}
\end{aligned} \quad (1)$$

where $\underline{\phi}_{21} = \underline{\phi}_2 - \underline{\phi}_1$ is the estimated phase difference between $\underline{\phi}_2$ and $\underline{\phi}_1$ and where $\underline{\phi}_{43} = \underline{\phi}_4 - \underline{\phi}_3$ is the estimated phase difference between $\underline{\phi}_4$ and $\underline{\phi}_3$.

If the estimated relative values were exact, then the sum given by Equation (1) would be zero. In the real-world, these estimations are typically not exact for reasons including the following: (i) an average value is used for a radar signal which is of finite duration and has a spread in the frequency spectrum; (ii) there is still a finite delay between the two signals and thus the two signals are not exactly time-coincident; and (iii) estimation accuracy is limited by noise. As a result, exact cancellation may not be achieved. Moreover, the effect is more noticeable at both the trailing and leading edges where there are transients and the SNR is low.

The vector sum of all four original signals 310, 320, 330, 340 is given by $$\sum (n = 1, 2, 3, 4)S_n = [a_1\cos(\phi_1) + a_2\cos(\phi_2) + \\
a_3\cos(\phi_3) + a_4\cos(\phi_4)] + \\
j[a_1\sin(\phi_1) + a_2\sin(\phi_2) + \\
a_3\sin(\phi_3) + a_4\sin(\phi_4)] \quad (2)$$

The power of the vector sum of the signals after the signals in Channel 2 and 4 are normalized and phase-shifted is given by $$(S_1 - \underline{S}_1 + S_3 - \underline{S}_3)(S_1 - \underline{S}_1 + S_3 - \underline{S}_3)^* = Re(S_1 - \underline{S}_1 + \\
S_3 - \underline{S}_3)^2 + Im(S_1 - \underline{S}_1 + S_3 - \underline{S}_3)^2 \quad (3)$$

where * denotes the conjugate and where "Re" and "Im" represent the real and imaginary parts of the complex quantity, respectively. The power of the sum of the original signals, given by Equation 2, is given by $$\Sigma(n=1,2,3,4)S_n\Sigma(n=1,2,3,4)S_n^* = Re(\Sigma(n=1,2,3,4)S_n)^2 + Im(\Sigma(n=1,2,3,4)S_n)^2 \quad (4)$$

The suppression ratio ("SR") expressed in dB is taken as $$SR_1(dB) = 10 \log_{10}((\Sigma(n=1,2,3,4)S_n\Sigma(n=1,2,3,4)S_n^*)/((S_1-\underline{S}_1+S_3-\underline{S}_3)(S_1-\underline{S}_1+S_3-\underline{S}_3)^*)) \quad (5)$$

The above definition for the suppression ratio is taken as the ratio of the residual signal power after the cancellation operation to the signal level when the four signals are combined vectorially. The latter power level is a strong function of the relative amplitude and phase of the signals in the four channels. Another definition, which is less sensitive to this dependence, is defined by adding all of the signal power in all four channels as $$SR_2(dB) = 10 \log_{10}((\Sigma(n=1,2,3,4)S_nS_n^*)/((S_1-\underline{S}_1+S_3-\underline{S}_3)(S_1-\underline{S}_1+S_3-\underline{S}_3)^*)) \quad (6)$$

This method may be used, for example, in the detection of an unknown radar signal in the presence of an interfering signal from friendly radar. The interfering signal is first recorded digitally and the relative amplitude and phase between the signals in the channels are computed and stored for subsequent interception. In order to maximize the cancellation effect, the relative position of the interfering radar with respect to the receiver must be fixed or changed very slowly in AOA during subsequent interception. Otherwise the stored data for the interfering signal must be updated more frequently. In this normalization process, the only relative quantities required correspond to the following four terms: $\underline{a}_2/\underline{a}_1$, $\underline{a}_3/\underline{a}_4$, $\phi_{21}$, and $\phi_{43}$.

The relative quantities $\underline{a}_2/\underline{a}_1$, $\underline{a}_3/\underline{a}_4$, $\phi_{21}$, and $\phi_{43}$ are of constant value and if they can be determined without error, then any subsequent pulses of the same signal can be suppressed effectively. The application of these constant values will only change the relative amplitude and phase of any other signals and should not affect the temporal characteristics of the signals. This signal suppression remains effective even when there are other signals arriving simultaneously.

In the following, two examples are provided illustrating the cancellation method described above. The first example uses simulated data while the second example uses data from real-world intercepted signals.

Example 1. Consider two simulated signals having bi-phased coding (i.e. Barker Code 11). Let the pulse widths of each signal be 1.1 μs long. The second antenna array pattern 230 illustrated in FIG. 2 will be used. The relative antenna element spacings for $d_{21}/\lambda_R$, $d_{31}/\lambda_R$, and $d_{41}/\lambda_R$ are 1.5, 4.0 and 1.5, respectively. $\lambda_R$ is the wavelength at a reference frequency of 9.6 GHz and $d_{21}$ is the antenna separation between elements 2 and 1. The phase transition for the coding is of a constant slope and a total elapsed time of 12 ns is required for a 180-degree phase transition. The interfering signal ("S1") is at a carrier frequency of 9550 MHz with a SNR of 40 dB and it is 10 dB stronger than the signal of interest ("S2"). In the simulation, the two signals arrive at different AOAs. The relative amplitudes ($\underline{a}_2/\underline{a}_1$ and $\underline{a}_3/\underline{a}_4$) and phases ($\phi_{21}$ and $\phi_{43}$) for S1 appearing in the four channels are (1 and 1) and (27.5° and 30°) respectively. For the signal of interest S2, ($\underline{a}_2/\underline{a}_1$ and $\underline{a}_3/\underline{a}_4$) and ($\phi_{21}$ and $\phi_{43}$) are (1 and 1) and (60° and 45°), respectively.

Figure 6:
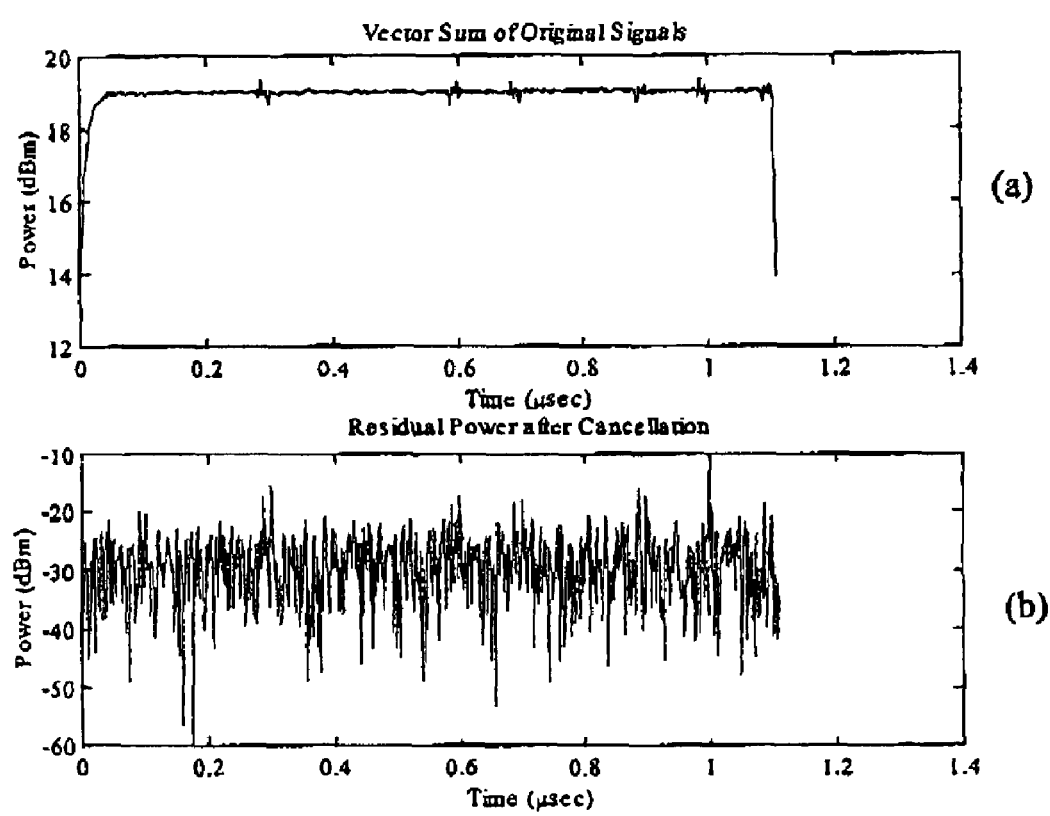
FIG. 6(a) is a graph illustrating the power distribution of the vector sum of the signal S1 from four channels before cancellation is applied in accordance with an embodiment of the invention.
FIG. 6(b) is a graph illustrating residual power distribution for S1 after cancellation is applied in accordance with an embodiment of the invention.
Figure 7:
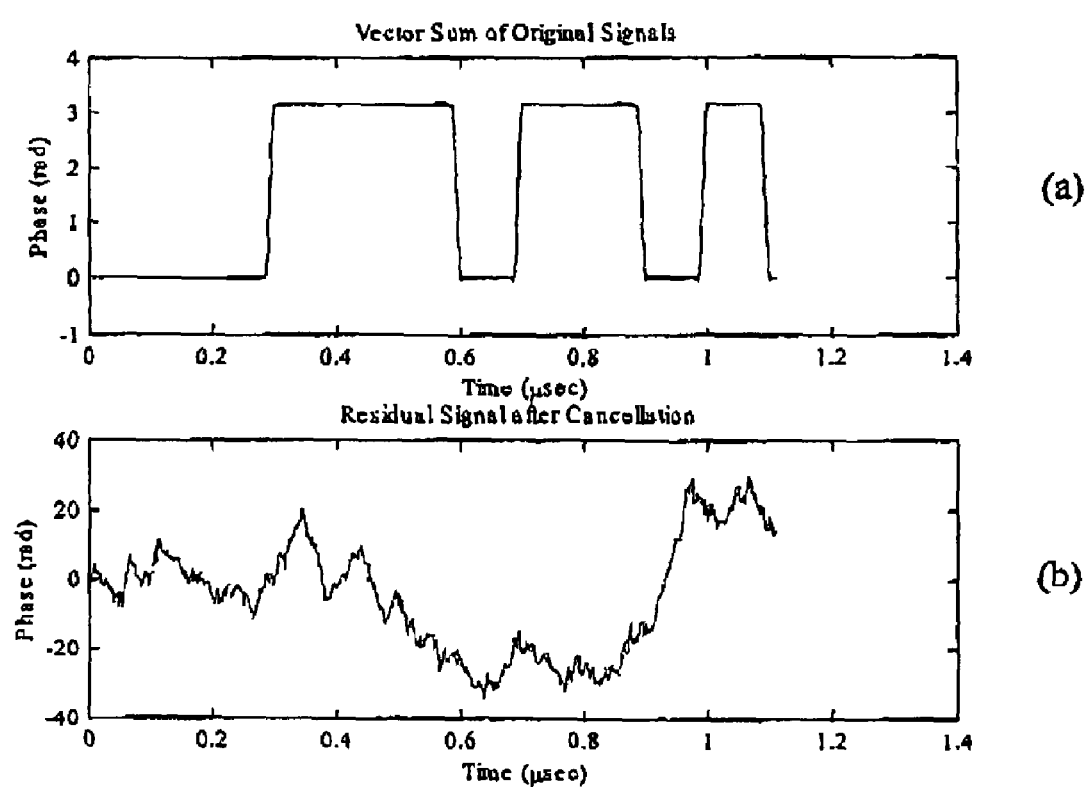
FIG. 7(a) is a graph illustrating the phase distribution of the vector sum of the signal S1 from four channels before cancellation is applied in accordance with an embodiment of the invention.
FIG. 7(b) is a graph illustrating residual phase distribution for S1 after cancellation is applied in accordance with an embodiment of the invention.

Referring to FIG. 6(a), there is shown a graph illustrating the power distribution of the vector sum of the signal S1 from four channels before cancellation is applied in accordance with an embodiment of the invention. Referring to FIG. 6(b), there is shown a graph illustrating residual power distribution for S1 after cancellation is applied in accordance with an embodiment of the invention. Referring to FIG. 7(a), there is shown a graph illustrating the phase distribution of the vector sum of the signal S1 from four channels before cancellation is applied in accordance with an embodiment of the invention. Referring to FIG. 7(b), there is shown a graph illustrating residual phase distribution for S1 after cancellation is applied in accordance with an embodiment of the invention. As can be observed in FIGS. 6(a) and (b), the average suppression ratio is approximately 40 dB. Relatively higher spikes are observed at the phase transitions of the signal after cancellation. These are due to transient and temporal changes in the phase of the signal. The interfering signal is cancelled out almost completely and the Barker code phase distribution is completely lost as illustrated in FIG. 7(b).

Figure 8:
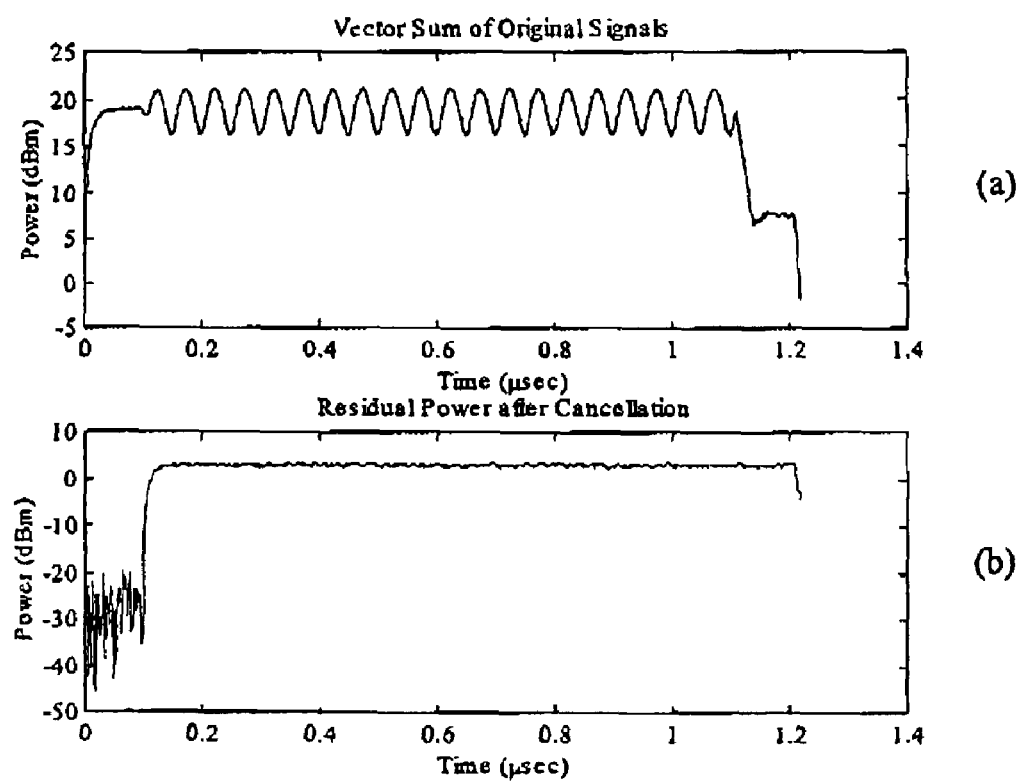
FIG. 8(a) is a graph illustrating the power distribution of the vector sum of the overlapping signals S1 and S2 from four channels before cancellation is applied in accordance with an embodiment of the invention.
FIG. 8(b) is a graph illustrating residual power distribution for S1 and S2 after cancellation is applied in accordance with an embodiment of the invention.
Figure 9:
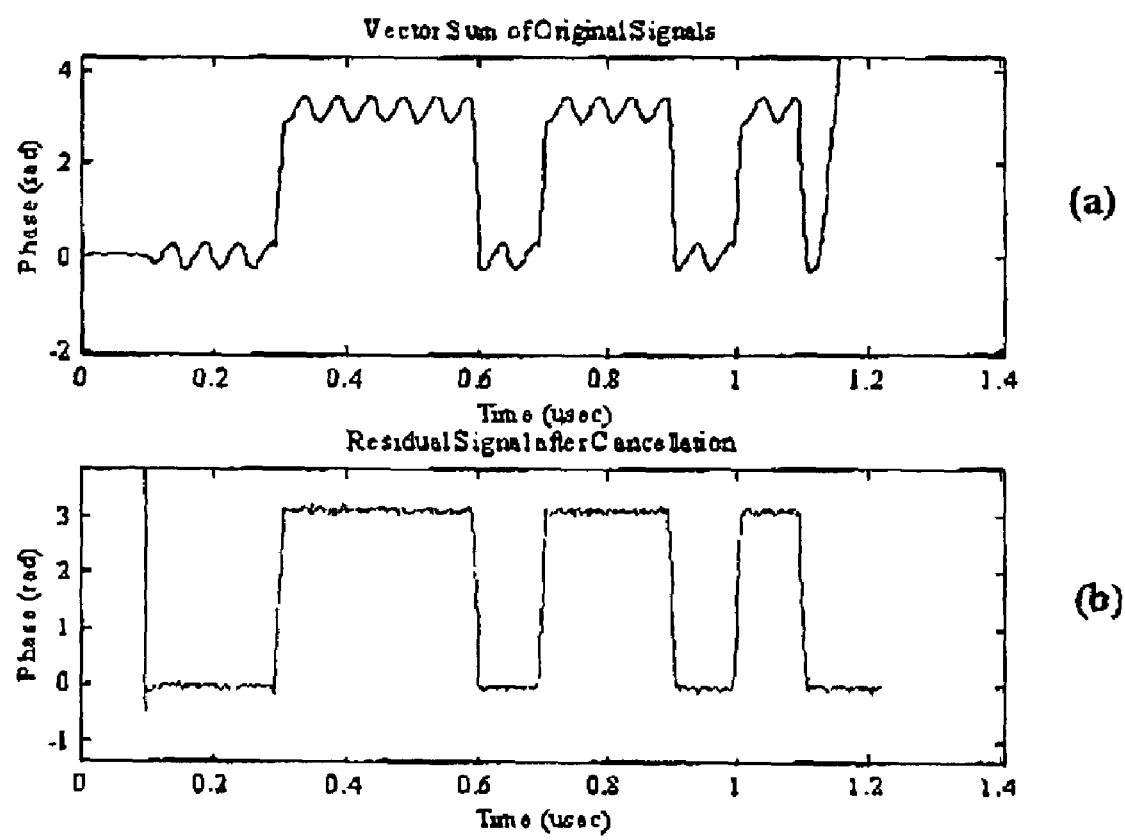
FIG. 9(a) is a graph illustrating the phase distribution of the vector sum of the overlapping signals S1 and S2 from four channels before cancellation is applied in accordance with an embodiment of the invention.
FIG. 9(b) is a graph illustrating residual phase distribution for S1 and S2 after cancellation is applied in accordance with an embodiment of the invention.

Referring to FIG. 8(a), there is shown a graph illustrating the power distribution of the vector sum of the overlapping signals S1 and S2 from four channels before cancellation is applied in accordance with an embodiment of the invention. Referring to FIG. 8(b), there is shown a graph illustrating residual power distribution for S1 and S2 after cancellation is applied in accordance with an embodiment of the invention. Referring to FIG. 9(a), there is shown a graph illustrating the phase distribution of the vector sum of the overlapping signals S1 and S2 from four channels before cancellation is applied in accordance with an embodiment of the invention. Referring to FIG. 9(b), there is shown a graph illustrating residual phase distribution for S1 and S2 after cancellation is applied in accordance with an embodiment of the invention. In the simulation, the desirable signal S2 arrives 0.1 μs after the arrival of the stronger interfering signal S1 and is 20 MHz higher in carrier frequency. The desirable signal S2 is 10 dB weaker and ripples are generated in both amplitude and phase distributions as the desirable signal S2 is mixed with the stronger interfering signal S1. After the cancellation method is applied, the stronger interfering signal S1 is effectively suppressed and the weaker signal of interest S1 is recovered as shown in FIGS. 8 and 9. As shown in FIG. 8, the power level of the stronger interfering signal S1 is greatly suppressed while in FIG. 9(b), the Barker phase pattern of the desirable weaker signal is recovered.

Example 2. Consider the following real-world data and situation. The adaptive receiver 200 with antenna array pattern 230 was located on shore. It was tracking two ships located at a distance from shore. The bearing of each ship was determined from intercepted signals which were emitted from navigation radar on the ships. The two ships were cruising in opposite directions with two radars ("Radar 1", "Radar 2") emitting on the first ship ("Ship 1") and one radar ("Radar 1") emitting on the second ship ("Ship 2"). The measured parameters and bearings of these three emitters are listed in Table 1.

TABLE 1

Signal Parameters of Three Emitters with Bearings

| Ship Number | Carrier Frequency (MHz) | PW (μs) | Bearing (Degrees) |
|---|---|---|---|
| Ship 1, Radar 1 | 9407.867 | 0.070 | 13.0 |
| Ship 1, Radar 2 | 9427.670 | 0.311 | 13.1 |
| Ship 2, Radar 1 | 9387.113 | 0.277 | −45.3 |

Figure 10:
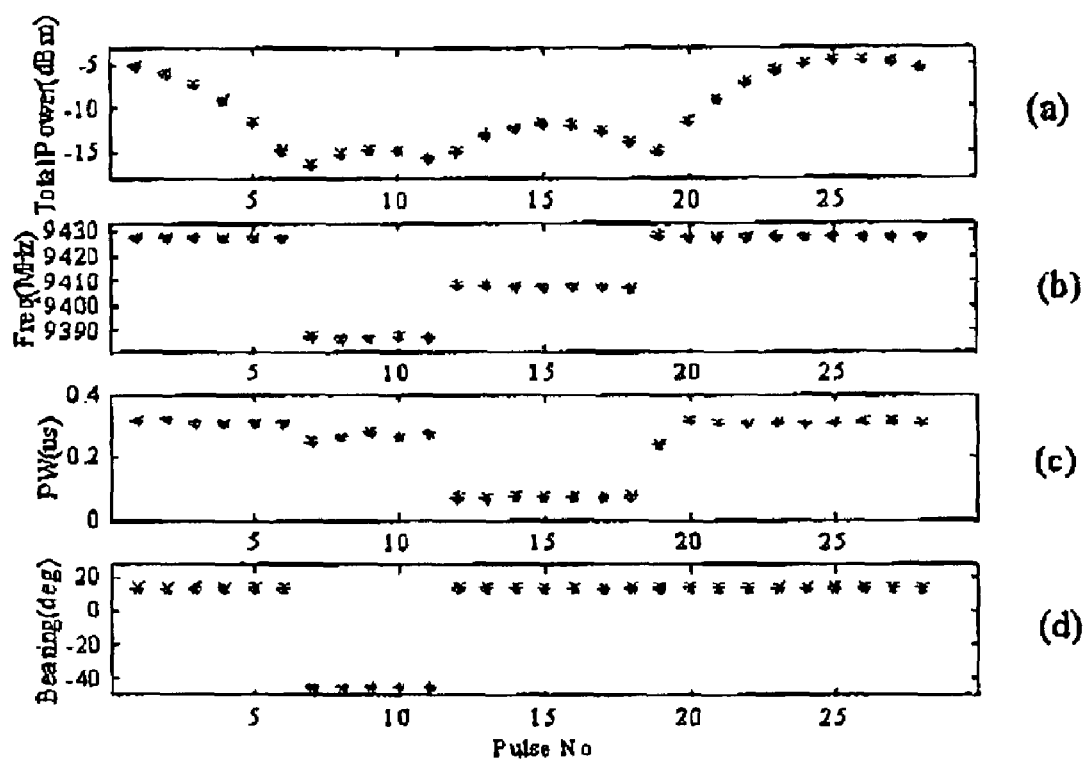
FIGS. 10(a), (b), (c), and (d), are graphs illustrating total power received by four channels, carrier frequency, pulse width, and bearing, respectively, for collected radar pulses from three ship-borne radar emitters, in accordance with an embodiment of the invention; and, FIGS. 11(a), (b), and (c), are graphs illustrating total received power, output power after the cancellation method is applied, and average suppression ratio, respectively, for collected radar pulses from three ship-borne radar emitters, in accordance with an embodiment of the invention.
Figure 11:
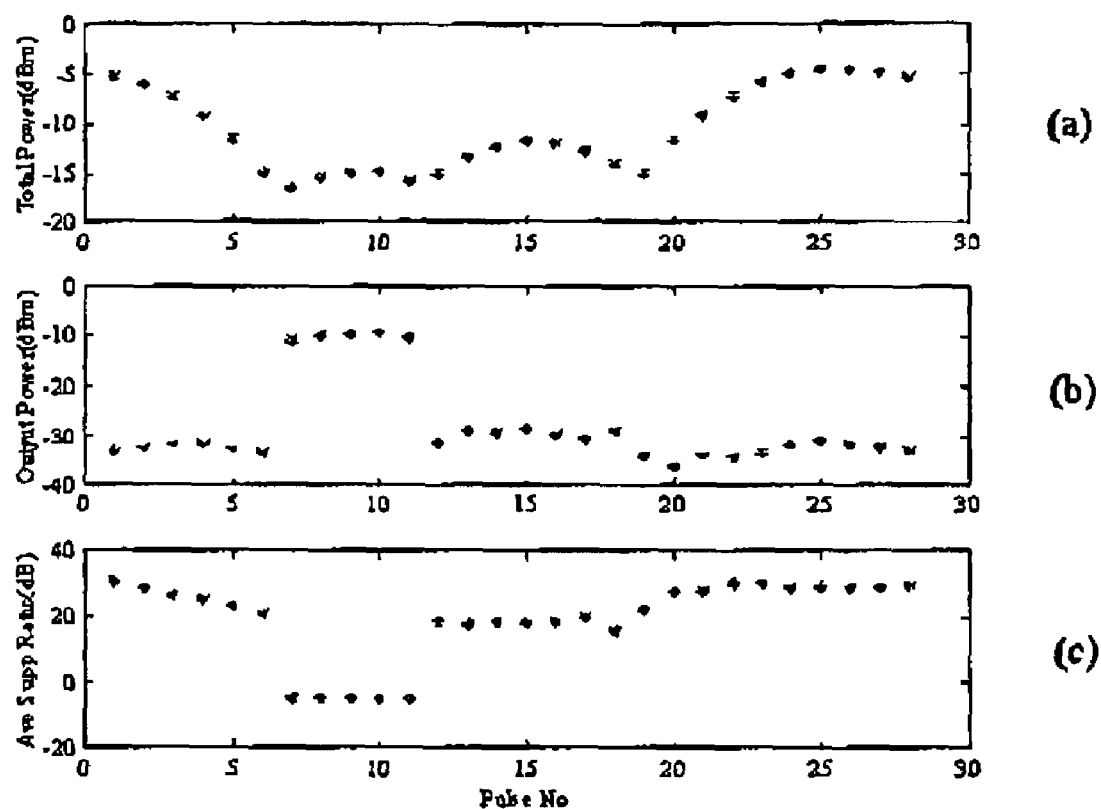

The distances of Ships 1 and 2 from the receiver were approximately 4.2 km and 8.5 km, respectively. Ships 1 and 2 were cruising at speeds of approximately 10 knots and 8.5 knots, respectively. Referring to FIGS. 10(*a*), (*b*), (*c*), and (*d*), there are shown graphs illustrating total power received by four channels, carrier frequency, pulse width, and bearing, respectively, for collected radar pulses from three ship-borne radar emitters, in accordance with an embodiment of the invention. Since the pulse widths were very narrow and the duty cycles were very small, the probability of pulse overlapping among the three emitters was also extremely small. Pulse Number 1 from Radar 2, Ship 1 (i.e. the first pulse appearing in both FIGS. 10 and 11) was stored and used to cancel out any subsequent pulses. Referring FIGS. 11(*a*), (*b*), and (*c*), there are shown graphs illustrating total received power, output power after the cancellation method was applied, and average suppression ratio, respectively, for collected radar pulses from three ship-borne radar emitters, in accordance with an embodiment of the invention. The pulses shown in FIG. 11 correspond to those shown in FIG. 10. In this example, the definition of suppression ratio given by Equation (6) above was used. The suppression ratio achieved for Radar 2, Ship 1, as shown in FIG. 11(*c*), was on the order of 30 dB with a strong SNR which is a favorable result. This suppression ratio decreases due to reduced SNR as the received signal power is reduced because of the scanning motion of the radar. Since Radar 1, Ship 2 was at a different bearing and at a slightly different frequency, the received signal remained virtually unaffected after the cancellation method was applied. For Radar 1, Ship 1, the signal power was still greatly attenuated after cancellation because the corresponding signal was received from only a slightly different bearing and at only a slightly different frequency. The cancellation of Radar 2, Ship 1 on the next scan (i.e. 1.98 seconds later) was still very effective as shown in FIG. 11.

Examples 1 and 2 show that the signal cancellation method of the present invention remains effective when the intercepted signal (S2) is overlapping in time with an interfering signal (S1), and the two signals (S1, S2) are very close in frequency. This situation is most likely to happen when high duty cycles and long duration signals are present. These examples also show that the cancellation method is not just effective in the case where the AOA of a signal is stationary, but remains effective if the AOAs of signals are changing slowly.

Data Carrier Product. The sequences of instructions which when executed cause the method described herein to be performed by the digital receiver architecture of FIG. 2 can be contained in a data carrier product according to an embodiment of the invention. This computer software product can be loaded into and run by the digital receiver architecture of FIG. 2.

Computer Software Product. The sequences of instructions which when executed cause the method described herein to be performed by the digital receiver architecture of FIG. 2 can be contained in a computer software product according to an embodiment of the invention. This computer software product can be loaded into and run by the digital receiver architecture of FIG. 2.

Integrated Circuit Product. The sequences of instructions which when executed cause the method described herein to be performed by the digital receiver architecture of FIG. 2 can be contained in an integrated circuit product including a coprocessor or memory according to an embodiment of the invention. This integrated circuit product can be installed in the digital receiver architecture of FIG. 2.

To reiterate and expand, the present invention includes the following unique features and advantages:

(a) An adaptive architecture using low-cost COTS components is provided to meet the stringent system performance requirements of multi-function digital receivers. The number of parallel receiver channels in the architecture is kept to a minimum and hence total system cost is reduced. The architecture includes four parallel channels. Four channels are used as this number of channels represents a good compromise between performance and cost. The architecture makes use of these four parallel channels to perform, adaptively, all of the functions typically required by a multi-function receiver. In addition, the architecture employs relatively low-cost COTS ADCs running at relatively modest rates. A switching matrix and several processing methods are used to achieve required system performance levels using the four parallel receiver channels. This adaptive multi-channel, multi-function intercept receiver architecture may be configured to provide improved instantaneous dynamic range and instantaneous frequency coverage while at the same time having the ability to cancel out interfering or undesirable signals.

(b) The adaptive architecture includes a switching matrix to transform a large number of antenna outputs into a smaller number of parallel receiving channels (e.g. four). Typically, one of the antenna outputs from each antenna face is mapped onto one of the four parallel channels for detecting the presence of signals from all four directions. Consequently, all of the signals from any direction within the down-converted frequency band may be detected and characterized. A coarse AOA may also be determined by using a method of amplitude comparison. Once the direction of a signal of interest is located within a quadrant, the switching matrix can be re-configured. Any four outputs of the antenna arrays in that particular face can then be routed to the four-channel receiver to accurately determine the corresponding azimuth and elevation angles. The switching matrix is also used to perform the functions of extending instantaneous frequency coverage, extending instantaneous dynamic range, and cancellation of interfering or unwanted signals.

(c) In order to improve the POI for searching unknown signals, the adaptive architecture provides for the extension of total instantaneous frequency coverage. If all of the four receiving channels are used to cover the same input frequency band, as is the case for normal operation, then the total instantaneous bandwidth will be limited by the sampling rate of the ADCs. However, if each of the four channels is used to cover a slightly different input frequency band, then a much broader instantaneous frequency coverage can be achieved using the same type of ADC. If a COTS ADC is assumed to be operating at a 1-GHz sampling rate, then an instantaneous bandwidth of 350 MHz may be achieved using a Hilbert transformer. If a 50-MHz guard band is allowed on each side of the band-pass filter, then an instantaneous frequency coverage of 250 MHz may be achieved. If each of the four channels is used to cover a slightly different input frequency band with a constant offset in frequency of 250 MHz, then an instantaneous frequency coverage of 1 GHz may be achieved with 50 MHz guard bands. The 50-MHz guard band is used between each of the four channels and at both edges of the 1-GHz filter band. As a result, a narrow band radar signal falling within the 1-GHz band will be detected in one of the four channels with a minimum available instantaneous bandwidth of 100 MHz. This minimizes signal distortion due to insufficient instantaneous bandwidth.

(d) The adaptive architecture provides for the extension of instantaneous dynamic range. The instantaneous dynamic range of current digital receivers is typically limited by the performance of available ADC devices. The increasing ADC requirements for EW applications are difficult to achieve with existing military and COTS ADCs. Commercial digitizers with ADCs sampling at a 1-GHz rate and with 8-bit resolution are widely available. One method for augmenting the limited instantaneous dynamic range of a single device is to use a number of these devices to cover different portions of a larger dynamic range. The first step in this method is to partition the required large instantaneous dynamic range into a number of smaller dynamic ranges that can be supported by each device. Some overlapping in dynamic range must be allowed for between the smaller dynamic ranges covered by contiguous devices. This overlapping allows a signal with a power level falling between two devices to be reconstructed later without degradation. This method for extending the overall instantaneous dynamic range may be implemented using the switching matrix included in the four-channel receiver architecture. Since there are already four parallel channels with four ADCs available in this architecture, there is no need to split the output signal from any of the four channels. Rather, the necessary step is to appropriately adjust the gain of the analog circuit feeding each ADC. If the instantaneous dynamic range (DR) of one ADC is assumed to be of 40 dB, and if half of this DR or 20 dB is chosen for overlapping, then a total instantaneous dynamic range of 100 dB can be achieved using the four parallel channels.

(e) The adaptive architecture provides for the rejection of unwanted or interfering signals. In general, since there are four channels in the architecture, the method cancels the signal appearing in Channel 1 by the signal in Channel 2, and the signal in Channel 3 by the signal in Channel 4. This method of signal cancellation remains effective when the intercepted signal is overlapping in time with an interfering signal, and the two signals are very close in frequency. This situation is most likely to happen when high duty cycles and long duration signals are present. This method is also effective not only in the case where the AOA of a signal is stationary, but also when the AOAs of signals are changing slowly.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. An adaptive receiver for determining parameters of an incoming signal, said receiver comprising:
   a) a plurality of antenna channels; each of said antenna channels including a respective antenna element for receiving said incoming signal and for outputting a respective antenna channel signal;
   b) a switching matrix operatively coupled to receive antenna channel signals from said antenna channels; said switching matrix for distributing said antenna channel signals to a plurality of receiver channels according to a predetermined mapping;
   c) a multi-channel down-converter operatively coupled to receive said antenna channel signals from said receiver channels; said multi-channel down-converter for processing said antenna channel signals to output respective intermediate frequency signals;
   d) a plurality of analog-to-digital converters (ADCs) operatively coupled to receive said intermediate frequency signals from said multi-channel down-converter; said ADCs for converting said intermediate frequency signals to digital signals; said digital signals being indicative of at least the phase and amplitude of said incoming signal; and,
   e) a digital processor operatively coupled to receive digital signals from said ADCs for determining said parameters.

2. The adaptive receiver of claim 1 wherein said multi-channel down-converter includes an intermediate frequency amplifier and a gain control circuit for each of said receiver channels for amplifying said intermediate frequency signals according to predetermined gains.

3. The adaptive receiver of claim 2 wherein said predetermined gains are selected to adjust the dynamic range coverage of said receiver channels to extend overall instantaneous dynamic range coverage.

4. The adaptive receiver of claim 1 wherein said intermediate frequency signals include predetermined offsets.

5. The adaptive receiver of claim 4 wherein said predetermined offsets are selected to adjust the instantaneous frequency range coverage of said receiver channels to extend overall instantaneous frequency range coverage.

6. The adaptive receiver of claim 1 wherein said plurality of receiver channels numbers four.

7. The adaptive receiver of claim 1 wherein said antenna element is included in an antenna face; said antenna face including a plurality of antenna elements.

8. The adaptive receiver of claim 7 wherein said antenna face is included in an antenna array block; said antenna array block including a plurality of antenna faces; each of said plurality of antenna faces pointing in a different direction.

9. The adaptive receiver of claim 8 wherein said plurality of antenna faces numbers four.

10. The adaptive receiver of claim 1 wherein said parameters include an angle-of-arrival (AOA) of said incoming signal.

11. The adaptive receiver of claim 1 wherein said incoming signal includes signals emitted from conventional and low probability of intercept (LPI) radar systems.

12. The adaptive receiver of claim 1 wherein said parameters include an average amplitude and a phase of an unwanted or interfering signal for digitally nullifying said unwanted or interfering signal by said digital processor.

13. The adaptive receiver of claim 1 wherein said multi-channel down-converter includes at least one local oscillator.

* * * * *